United States Patent
McDonald

(10) Patent No.: US 7,445,156 B2
(45) Date of Patent: Nov. 4, 2008

(54) MEMORY CARD MAGAZINE SYSTEM

(76) Inventor: James A. McDonald, 940 Colonial La., Palo Alto, CA (US) 94303

( * ) Notice: Subject to any disclaimer, the term of this patent is extended or adjusted under 35 U.S.C. 154(b) by 0 days.

(21) Appl. No.: 11/542,795

(22) Filed: Oct. 3, 2006

(65) Prior Publication Data

US 2007/0075144 A1 Apr. 5, 2007

Related U.S. Application Data

(60) Provisional application No. 60/723,212, filed on Oct. 3, 2005.

(51) Int. Cl.
  *G06K 7/00* (2006.01)
(52) U.S. Cl. .................. 235/486; 235/451; 235/482; 235/492; 235/495; 361/796; 361/797; 361/798; 361/799; 361/800; 361/801; 361/802; 361/803; 361/737; 361/752; 439/61; 439/65; 439/630; 439/631

(58) Field of Classification Search ............... 235/492, 235/486, 451, 495, 482; 439/630, 945, 61, 439/65, 631; 361/796–803, 736, 737, 752, 361/785, 816
See application file for complete search history.

(56) References Cited

U.S. PATENT DOCUMENTS

| 5,176,523 | A | * | 1/1993 | Lai ............................ 439/64 |
| 5,184,282 | A | * | 2/1993 | Kaneda et al. ............. 361/737 |
| 5,449,297 | A | * | 9/1995 | Bellomo et al. ............ 439/630 |
| 6,195,266 | B1 | * | 2/2001 | Padgett et al. .............. 361/799 |
| 6,545,877 | B1 | * | 4/2003 | Agha et al. ................ 361/801 |
| 6,900,980 | B2 | * | 5/2005 | Christopher ............... 361/683 |

* cited by examiner

*Primary Examiner*—Steven S Paik
*Assistant Examiner*—Tuyen K Vo
(74) *Attorney, Agent, or Firm*—Knobbe Martens Olson & Bear LLP

(57) ABSTRACT

A data management device and library are provided for organizing, holding, and providing electrical connectivity to multiple memory cards. The data management device can comprise a device body, a plurality of sockets to accommodate the data storage media, an electrical connector, and a power management circuit. Data can be retrieved from or transferred to the selected memory cards utilizing the device. The data management library can be utilized to interconnect multiple devices and can be daisy chained to other libraries.

7 Claims, 7 Drawing Sheets

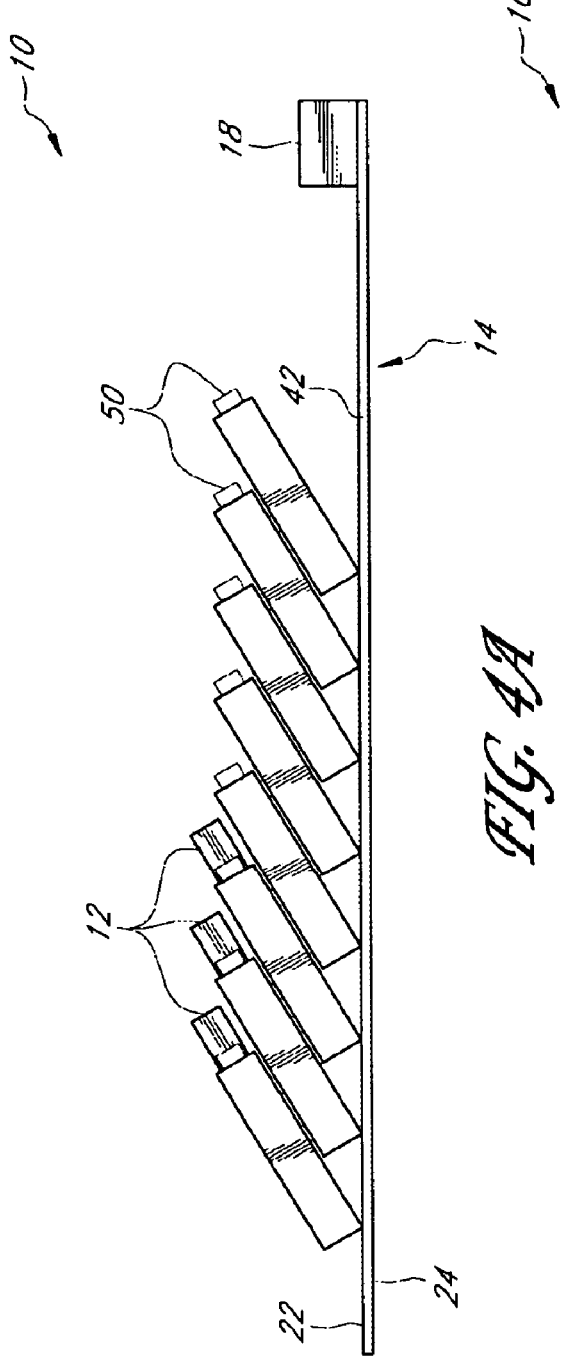
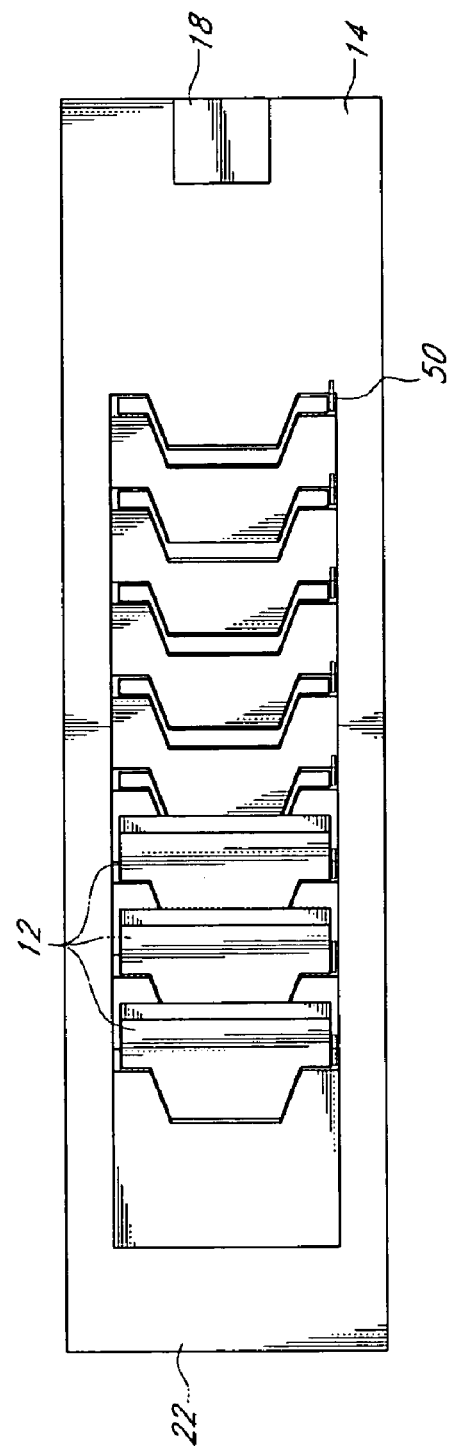

MEMORY CARD MAGAZINE SYSTEM

CROSS-REFERENCE TO RELATED APPLICATIONS

This application claims the benefit of U.S. Provisional Application No. 60/723,212, filed Oct. 3, 2005, the disclosure of which is hereby incorporated by reference.

BACKGROUND OF THE INVENTIONS

1. Field of the Inventions

The present invention relates to devices for physically storing, and electrically connecting to, solid-state memory cards.

2. Description of the Related Art

Memory cards with non-volatile memory, such as flash memory, are becoming increasingly popular for digital imaging and music applications. Examples of existing types of memory cards include PCMCIA, both type I and II, CF (Compact Flash), SD (Secure Digital), XD, MMC (Memory Media Card), SM (smart memory). Personal computers often have readers for specific types of memory cards. Typically, these readers only permit the PC to access a single card at a time.

Memory cards have found numerous applications in digital imaging, digital photography, video storage, music storage, and as portable data media. As the popularity of these devices has grown, individuals often have many cards to deal with at a time. For example, digital photographers commonly keep several Compact Flash or Secure Digital cards in their camera bags or another handy place. Because a photographer will commonly use different memory cards with different cameras, and/or will change the cards frequently, the task of organizing and locating the memory cards can be burdensome. In addition, the memory cards can easily be damaged, resulting in a loss of data. Similar problems exist with other applications in which users commonly have multiple memory cards.

SUMMARY

Memory card readers exist that allow different kinds of media to be read. For example, 4-port readers exist that accept one of each of the following types of cards: CF, SD, SM and MMC. Also, readers exist that can read 7 or 8 different types of memory cards. However, these readers typically do not allow multiple cards of the same type to be installed at the same time. Therefore, there is a need in the art for an apparatus that can accommodate a plurality of memory cards simultaneously. Further, there is a need for an apparatus that can store a plurality of cards and provide electronic communication with each of the cards. Finally, there is a need in the art for an apparatus that provides selective communication to a plurality of cards disposed therein for storing and/or retrieving data to/from the cards.

In accordance with one embodiment of the invention, a data management device is provided for physically holding, and providing electrical connectivity to, multiple data storage media, such as memory cards and the like. In an exemplary implementation that addresses some of the above-mentioned needs, a host computing device such as a digital camera, can wirelessly communicate with and write data to the memory cards that are inserted in the data management device. In such an implementation, a photographer may carry the data management device in her camera bag, take photos as needed, and later remove the data management device and connect it to a personal computer to read the data from the cards.

The data management device preferably comprises a device body, a plurality of receptacles to accommodate the data storage media/memory cards, an electrical connector, and a power management circuit. According to one embodiment, the device body can have upper and lower portions. The receptacles can each be disposed on the device body, and each receptacle can define a width and a longitudinal depth. The receptacles can be sized and configured to removably receive a data storage medium therein. Each receptacle can have a physical connector for accessing data contained on the respective data storage medium when the data storage medium is in an engaged position within the receptacle.

The electrical connector can be disposed on the device body and have at least one integrated circuit device that can be in electrical communication with each of the physical connectors of each of the plurality of receptacles. The electrical connector can provide connectivity between a computing device and each of the receptacles for facilitating electrical communication with data storage media disposed therein. The power management circuit can be in electrical communication with the receptacles to supply power to at least one of the receptacles for powering a data storage medium disposed therein.

In some embodiments, the data management device can be a memory card magazine that can comprise multiple physical sockets (at least three, and preferably in the range of 4 to 16) and the device body can be a substrate, such as a printed circuit board, to which each of the card sockets can be attached. Each socket can be adapted to accept a single memory card. All of the sockets can be configured for the same type of memory card (e.g., eight or ten CF slots may be provided), or different slots can be provided for different types of cards (e.g., four CF slots and four SD slots).

The sockets are preferably mounted in a compact, parallel arrangement to the PC board, or other substrate, to provide for high-density storage of multiple memory cards. The sockets can be oriented either perpendicularly or at an acute angle with respect to the PC board.

The electrical connector can be one of, or a combination of, a USB, Ethernet, IEEE 802.11, Bluetooth, or 1394 (Firewire) interface. Other wired or wireless interfaces may also be used. The electrical connector enables a host computing device such as a PC, PDA (Personal Digital Assistant) or digital camera to read data from and/or write data to the memory cards that are inserted in to the data management device. For example, the electrical connector could optionally be used to connect to a digital camera or video camera for the purpose of transferring image data to the memory cards.

The memory card magazine can optionally be provided with software utility that can run on a host computer, such as a PC. This software utility may, for example, operate as a device driver, and can be capable of performing one or more of the following tasks: volume naming and recognition, automatic file and subdirectory renaming, file time and date inspection and synchronization, file transfer and backup.

In another embodiment, a data management library is provided for organizing a plurality of data storage media disposed within a respective plurality of data management devices. The library can comprise a library housing, a controller, and a power management circuit. The library housing can have a plurality of device ports for connecting to each of the plurality of data management devices. Further, the library housing can have a communications port for connecting the library to a computing device for providing connectivity between the computing device and each of the receptacles of the data management devices connected to the library for facilitating electrical communication with data storage media disposed therein.

The library's controller can provide selective access between the data management devices. Further, the power management circuit can be in electrical communication with the device ports to supply power to at least one of the data management devices for powering a data storage medium disposed therein. The power management circuit can therefore provide power to the data storage medium in response to the controller.

Neither this summary nor the following detailed description purports to define or limit the invention. The invention is defined by the claims.

BRIEF DESCRIPTION OF THE DRAWINGS

The above-mentioned and other features are described below with reference to the drawings of the preferred embodiments. The illustrated embodiments are intended to illustrate, but not to limit the invention. The drawings contain the following figures:

FIG. 4A is a side view of a card magazine according to another embodiment.

FIG. 4B is a top view of the card magazine shown in FIG. 4A.

DETAILED DESCRIPTION OF THE PREFERRED EMBODIMENTS

Figure 1:
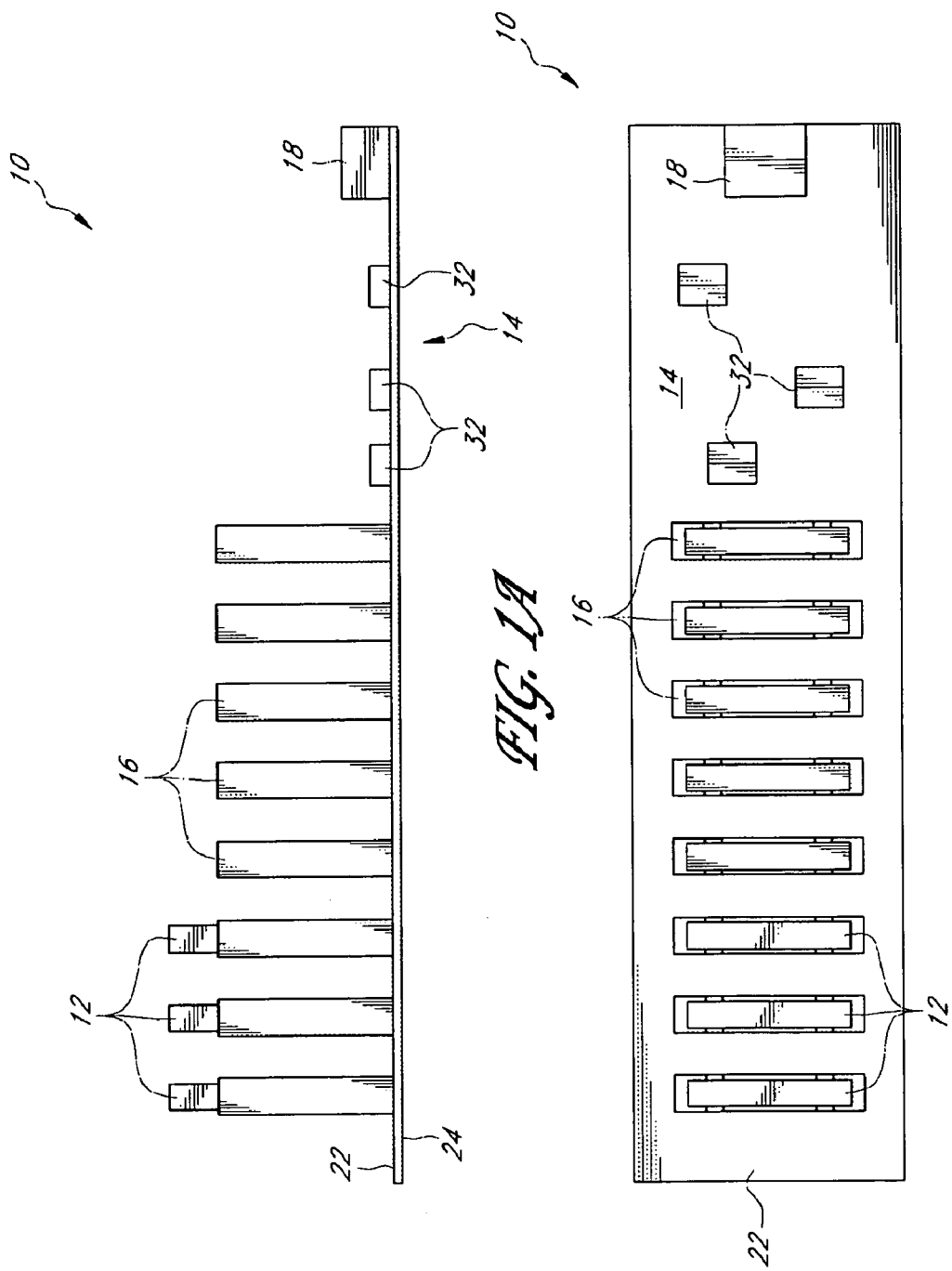
FIG. 1A is a side view of a memory card magazine having a plurality of sockets according to an embodiment.
FIG. 1B is a top view of the card magazine shown in FIG. 1A.
Figure 2:
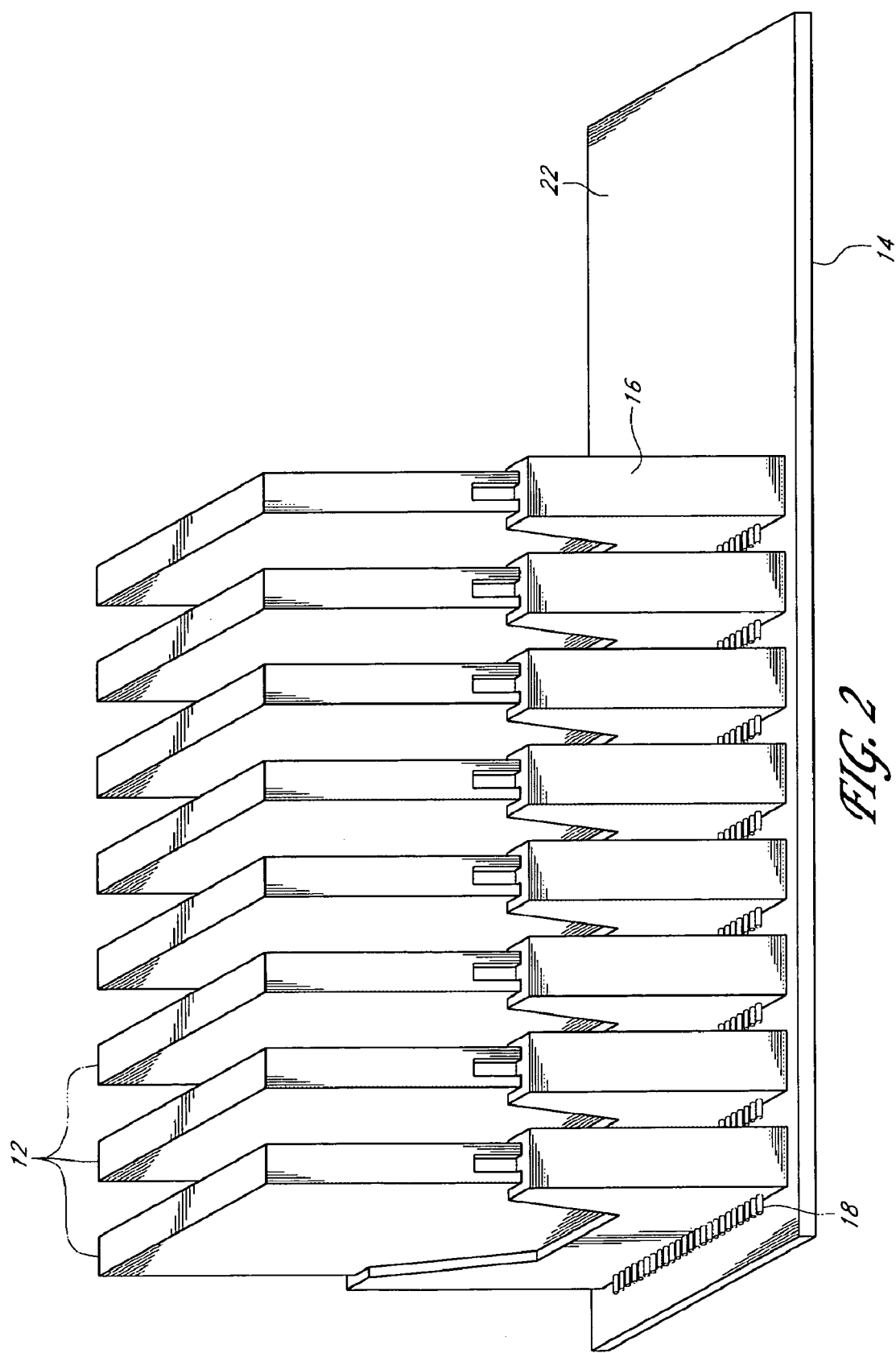
FIG. 2 is a perspective view of the card magazine shown in FIGS. 1A-B, with memory cards inserted in each of the sockets.

Specific embodiments of the invention will now be described with reference to the drawings. These embodiments are exemplary but non-limiting. Thus, nothing in the following description is intended to suggest that any particular feature, characteristic or component is essential to the invention.

FIGS. 1-6 illustrate embodiments of a card magazine 10 that can be utilized to physically organize and electronically access a plurality of memory cards 12. The card magazine 10 comprises a substrate or device body 14 (typically comprising or consisting of a printed circuit board, backplane, or other substrate), a plurality of sockets 16 to accommodate respective memory cards 12, and a electrical connector 18, such as a USB port, and associated circuitry (see example circuit shown in FIG. 6). The substrate or device body 14 has an upper portion 22 and a lower portion 24. The magazine 10 preferably has a robust physical design that is compact and resistant to shock and damage. This can be particularly useful to people who carry memory cards in hostile environments, such as digital photographers. In some embodiments, a plastic or metal housing (not shown) houses the circuit board and other components shown in FIGS. 1A-4B, but exposes the sockets 16 the electrical connector 18. Preferably, the sockets 16 are arranged in a way that allows for easy insertion and removal of the memory cards 12, yet permits the memory cards 12 to be arranged in a high density configuration.

FIGS. 1A, 1B, 2 and 3 illustrate an embodiment of the card magazine 10, wherein the card magazine 10 includes the substrate 14 and eight sockets 16 coupled to the substrate 14. The sockets 16 are preferably configured to accommodate at least one type of memory card 12. For example, the sockets 16 may be configured to receive one of the following types of memory cards: Compact Flash (CF), PC Card (PCMCIA), Secure Digital (SD), x-D Picture Card, Multimedia Cards (MMC), SmartMedia (SM), or Memory Stick (MS). (In the particular examples shown in the drawings, the sockets 16 are commercially available Compact Flash card sockets.) In other embodiments, the number of sockets 16 can be varied, preferably within the range of four to sixteen (e.g., 4, 10, 12 or 16). Additionally, as described below, the magazine 10 can be configured such that the sockets 16 accept a single or multiple types of non-volatile memory card.

Figure 3:
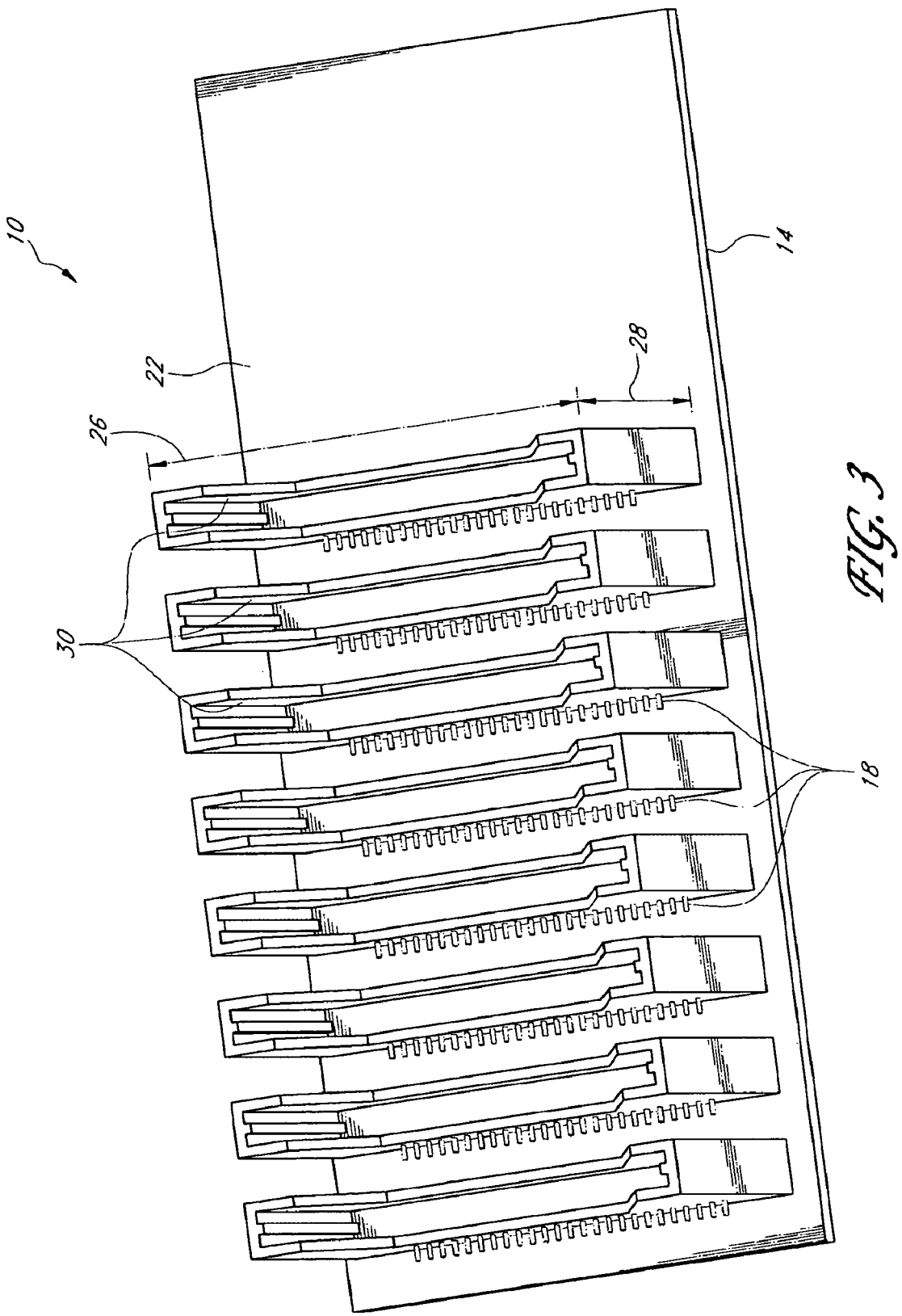
FIG. 3 is perspective view of the card magazine shown in FIGS. 1A-B, with memory cards being removed from the sockets.

As illustrated in FIG. 3, the sockets 16 are each disposed on the substrate or device body 14. In this embodiment, the sockets 16 are mounted perpendicularly to the substrate 14. However, the configuration of the sockets 16 can be variously modified. As illustrated in FIGS. 1A-3, a bottom portion of each socket 16 is physically and electrically coupled to the substrate 14 in order to provide electrical communication with any memory cards inserted therein.

The sockets 16 can be formed as a receptacle that is sized and configured to receive at least a portion the memory card 12 therein. The sockets 16 can be formed separately from the substrate or device body 14 as shown, or can be incorporated into and formed integrally with the substrate or device body 14. Each socket 16 defines a width 26 and a longitudinal depth 28, which preferably correspond to the size of the memory card 12. Further, an interior portion of each socket 16 includes an engaging member that engages the memory card 12 when inserted therein to an engaged position, as illustrated in FIG. 4A. Each socket 16 includes a data communications connector 30 that is electrically coupled to the magazine's electrical connector 18, as described below.

The card magazine's electrical connector 18 includes a physical connector that is electrically connected to a plurality of integrated circuit devices 32 mounted to the substrate 14. The electrical connector 18 provides connectivity between a computing device 40 and each of the sockets 16 for facilitating electrical communication with the memory cards 12. The electrical connector 18 of the magazine 10 is preferably a USB port, but may alternatively be an Ethernet, IEEE 802.11, Bluetooth, or 1394 (Firewire) interface. Other wired and wireless interfaces are possible, and multiple different types of interfaces may be provided.

When a connection is established between the host computing device 40 and the and the card magazine 10 in the illustrated embodiment, the host computing device 40 preferably provides power to the active circuitry of the card magazine 10, and provides power to the memory cards themselves, via the USB port 18. A power management circuit 20 (FIG. 6) is capable of selectively providing power to each of the sockets and memory cards.

In some embodiments, the power management circuit 20 can power up only one (or some other subset) of the sockets 16 (and memory cards 12 disposed in the powered-up sockets) at a time. This can be advantageous in order to reduce power consumption, and further considering that often, the power supplied over a USB connection is not sufficient to keep all memory cards 12 powered up simultaneously. The power management circuit 20 can receive messages from a driver of the host computing device 40 via the interface 18 to control the activation and deactivation of power for the various cards 12.

Although the card magazine 10 can be powered fully by the host computing device 40 over a USB or other interface 18, in some applications it may be desirable to power the card magazine 10 in-whole or in-part by battery, and/or by connection to an AC outlet. For example, in some embodiments, the card magazine 10 can be provided with a WIFI or other wireless interface for wirelessly transferring data to and from the memory cards 12. To power the wireless interface, the card magazine 10 may be designed to receive or connect to a rechargeable battery pack. In some embodiments, the battery pack can be charged automatically via the USB port whenever the card magazine 10 is connected to a computing device 40, such as a personal computer.

FIGS. 4A and 4B illustrate another embodiment of the card magazine 10. In this embodiment, the sockets 16 are arranged at an acute angle relative to the circuit board backplane or other substrate 14. As shown in FIG. 4A, the sockets are oriented at an acute angle relative to a substrate/circuit board backplane 14, 42. The acute angle between the sockets 16 and the circuit board backplane 42 is preferably in the range of 15 to 45 degrees, and more preferably in the range of 25 to 40 degrees.

Other embodiments are contemplated wherein the sockets 16 are not disposed along a flat substrate 14. For example, the configuration of the magazine 10 can be modified such that the sockets 16 are oriented in a radial pattern, or other geometric patterns that preferably provide for a compact, highly-portable, and efficiently-sized magazine 10. Thus, the shape and features of the magazine 10 can be altered according to the application and requirements of the user.

With reference to FIGS. 4A-4B, the acute-angular orientation of the sockets 16 can allow the user to more easily view the memory cards and their labels, and to eject the cards from their sockets 16. The sockets 16 can be attached to the substrate 14 or backplane 42 both by soldering and other attachment means such as other adhesives, fasteners, clamps, and geometries including recesses having snap-fit pins or clasps.

The card mounting angle can be achieved either by using sockets 16 that are specially configured to be mounted at an angle. Such sockets can include a modified base portion that mates with the substrate 14 at an angle. Alternatively, socket assemblies can be formed wherein the sockets 16 are formed unitarily therewith and rigidly supported at the specified angle.

The card guides and sockets may also incorporate a mechanical latch or ejector member 50 that retains the memory card, preventing accidental removal or loss. As shown in FIGS. 4A-4B, the ejector member 50 can be disposed adjacent the socket 16, and is operative to release a memory card 12 from the engaged position to facilitate card removal. This latch can be released by finger pressure when the card 12 is intentionally removed.

Figure 5:
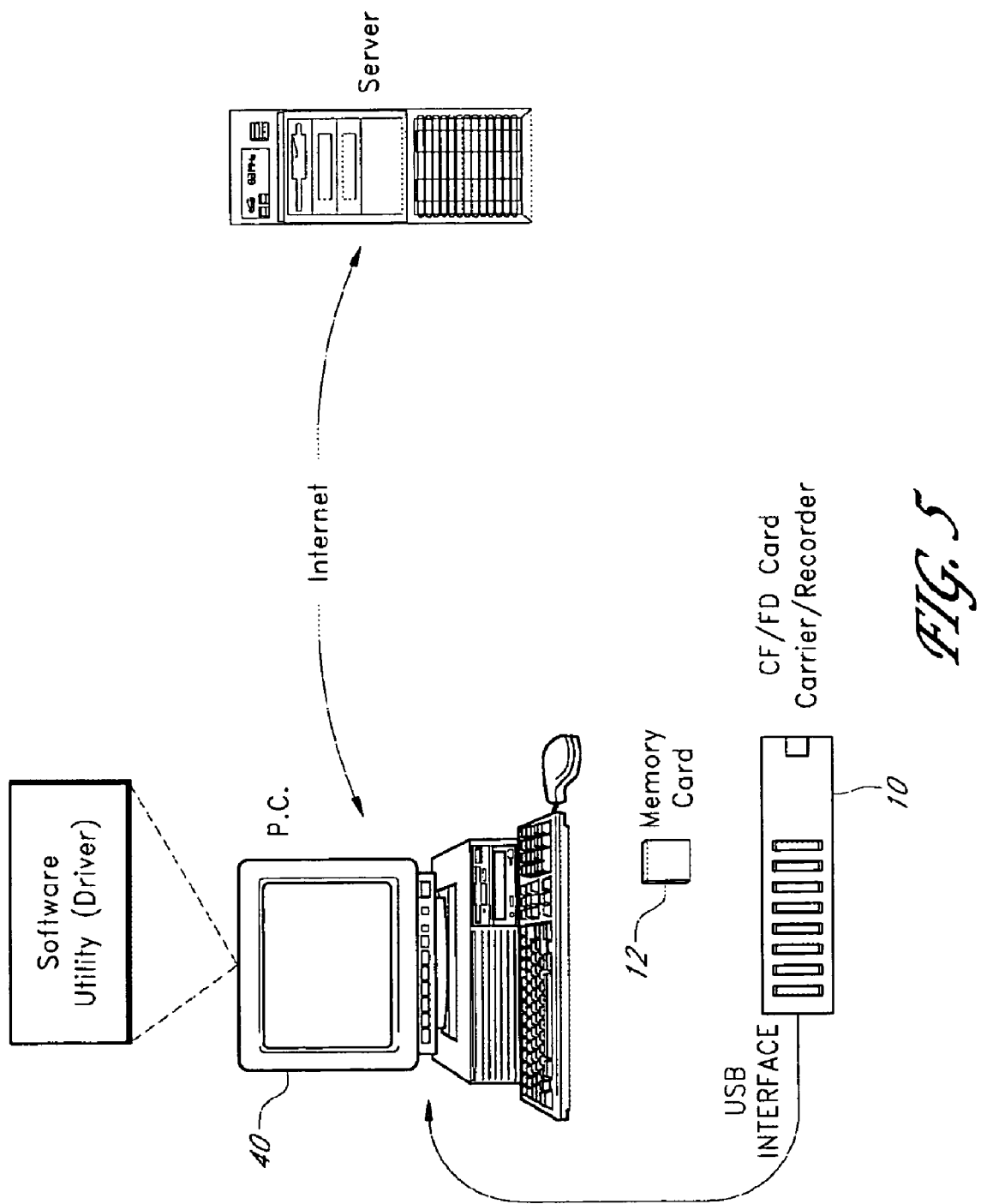
FIG. 5 is a card magazine can be connected to a personal computer, which may include software for providing various card management functions.

FIG. 5 shows a connection between a card magazine 10 (such as those shown in the preceding drawings) and a computing device 40, such as a personal computer. Via this connection, the PC can access each of the memory cards 12 at or near the maximum data rate supported by the USB interface 18.

As illustrated in FIG. 5, an optional software utility can be supplied with the card magazine 10 and installed on the PC 40. This software utility may operate as a device driver for the card magazine 10, and can, for example, be capable of performing some or all of the following operations: volume naming and recognition, automatic file and subdirectory renaming, file time and date inspection and synchronization, backing up or transferring photos or other files stored on the memory cards to the PC's hard drive and/or a remote server, movement of files between card magazines (see description of memory card library below).

In one embodiment, the software utility includes a device driver or service that provides an http socket interface that can be accessed from a web browser, allowing access to the memory cards 12 and their contents using a web browser on the host computer 40. This creates an easy-to-use interface for memory cards. The web-browser interface provides seamless access to the memory cards and facilitates transfer of data from the cards both to local destinations on the PC 40 and remote locations via the network.

In the context of digital photography, a photographer could use the card magazine 10 as a portable holder and organizer for storing a collection of memory cards 12. In embodiments that do not include a wireless interface, the photographer could physically transfer specific memory cards 12 between the card magazine 10 and one or more cameras, as needed. In embodiments that include a wireless interface, the photographer could instead use a camera that is capable of wirelessly transferring digital photos to the card magazine 10, such that the memory cards 12 need not be removed therefrom. In such use cases, the card magazine 10 need only be kept within wireless range of the camera during use, such as in the photographer's camera bag. When the photographer wishes to review, edit, or otherwise process the photos stored on the memory cards, the photographer could connect the card magazine to a PC through a physical or a wireless connection.

Figure 6:
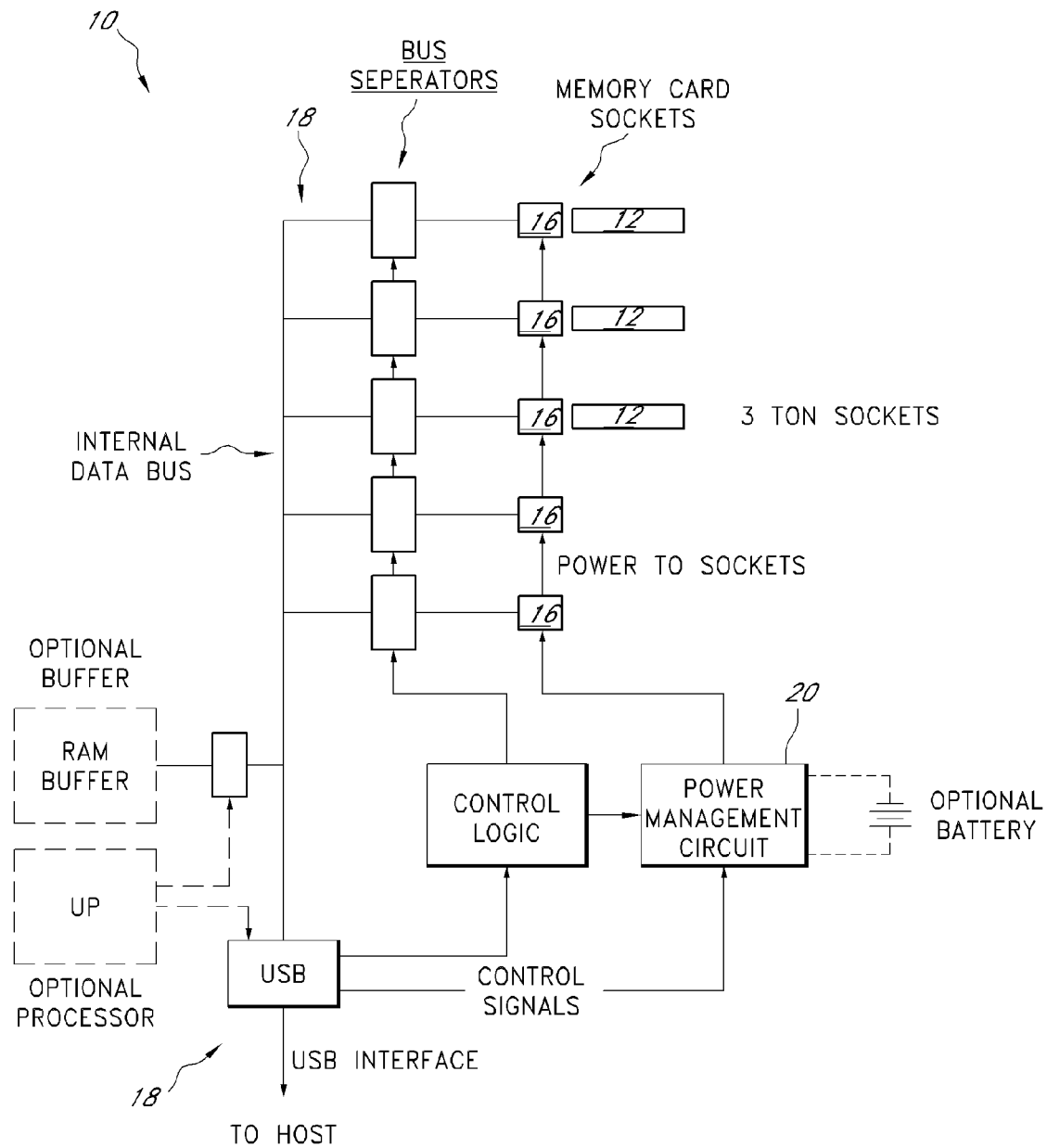
FIG. 6 is a block diagram of computer hardware that can be included in the card magazine, according to an embodiment.

With reference now to FIG. 6, a block diagram is provided that illustrates an embodiment of circuitry that can be provided in the card magazine 10. As illustrated, the power control circuit 20 provides power from the electrical connector 18 (illustrated as a USB port), and from an optional battery, to each of the memory card sockets 16. Each memory card socket 16 is connected to a shared bus by a respective bus separator. The card magazine 10 also optionally includes a RAM buffer and a microprocessor. Where provided, the microprocessor can run firmware for performing such functions as detecting blank memory cards, checking the status of the memory cards, copying or erasing memory cards, performing wireless transfers, and/or spreading data across memory cards (e.g., using a mirroring or RAID algorithm) to provide redundancy. The firmware can communicate with the device driver software for purposes of performing some of these functions. As discussed above, the card magazine 10 can also be provided with a wireless interface (not shown in FIG. 6).

Figure 7:
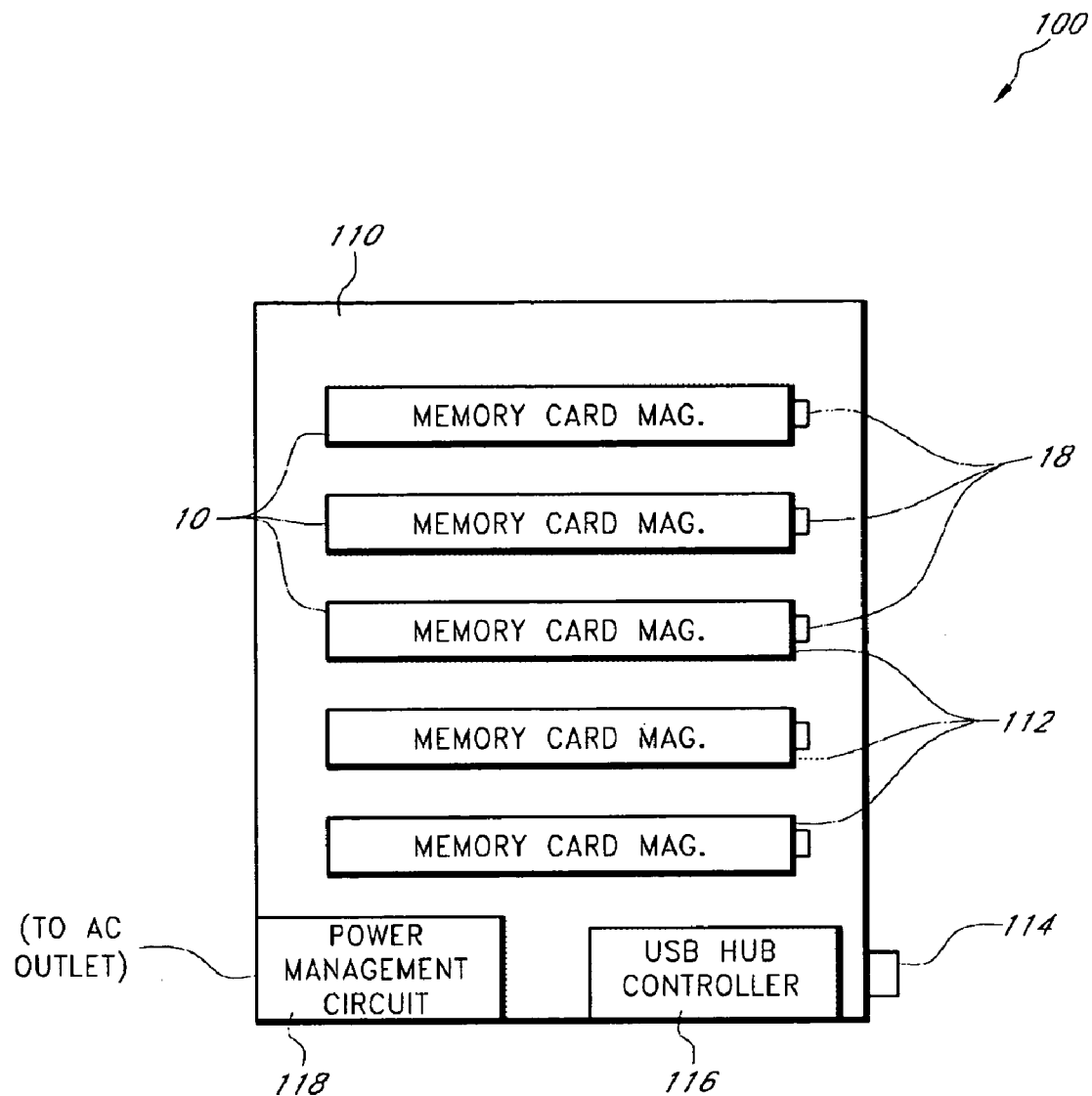
FIG. 7 is a top view of a data management library illustrating the interconnection of multiple card magazines that can be accessed via a communication port, according to another embodiment.

Some users may have a sufficiently large collection of memory cards 12 to justify the ownership of two or more memory card magazines 10. To accommodate such users, a data management/memory card library 100 can be provided which is capable of holding, and providing concurrent data connectivity to, multiple card magazines 10. One embodiment of such a library 100 is shown in FIG. 7. In this embodiment, the memory card library 100 is capable of providing concurrent access to five card magazines 10. Further, the library 100 is configured to physically hold and support the magazines 10 in a stacked arrangement. While illustrated as being in a stacked arrangement, other arrangements are also possible, such as side-by-side, etc.

In the embodiment illustrated in FIG. 7, the library 100 comprises a library housing 110 having a plurality of device ports 112 for connecting to each of the plurality of card magazines 10. The device ports 112 can be configured as recesses, slots, indents, or be of other geometries, and can be disposed in the housing 110. Preferably, the ports device 112 can be used to rigidly and removably interconnect with a card magazine 10 while being used in the library 100. For example, the card magazines 10 can slide or snap into place within the housing 110 of the library 100, such that the user can easily insert and remove card magazines 10 as needed.

The library housing 110 can further comprise a communications port 114 for connecting the library 100 to a computing device 40 for providing connectivity between the computing device 40 and each of the sockets 16 of the card magazines 10 connected to the library 100. The communications port 114 can be one of, or a combination of a USB, Ethernet, IEEE 802.11, Bluetooth, 1394 (Firewire) interface, and/or other wired or wireless interface. Thus, the library 100 can enable electrical communication between the cards 12 disposed in multiple card magazines 10 and the computing device 40.

In addition, the library 100 comprises a controller 116, such as a USB hub controller, that provides selective access to the card magazines 10. The controller 116 can enable a user to manually select between the card magazines 10 as desired, and/or can be capable of automatically selecting a given card magazine for purposes of writing or reading data.

Further, each card magazine 10 can electrically connect to the library 100 with, and be powered by, its respective USB port. The library 100 further comprises a power management circuit 118 that is in electrical communication with the card magazines 10 disposed thereon. In one implementation, the power management circuit 118 is in electrical communication with the device ports 112 to supply power to the card magazines 10 from an AC outlet. The power management circuit 118 can selectively provide power to the card magazines as needed.

The memory card library 100 can also be capable of being connected or "daisy chained" to other libraries 100 to facilitate expandability. The library 100 can be designed to be plugged into an AC outlet, or can receive power from the host computing device via a USB connection.

Although the invention has been disclosed in the context of certain preferred embodiments and examples, it will be understood by those skilled in the art that the present invention extends beyond the specifically disclosed embodiments to other alternative embodiments and obvious modifications and equivalents thereof. In addition, while several variations have been shown and described in detail, other modifications, which are within the scope of the invention, will be readily apparent to those of skill in the art based upon this disclosure.

It is also contemplated that various combinations or sub-combinations of the specific features and aspects of the embodiments may be made and still fall within the scope of this disclosure. The scope of the invention is defined by the following claims.

What is claimed is:

1. A data management device for organizing a plurality of data storage media, the device comprising:
   a device body;
   a plurality of receptacles being disposed on the device body, each receptacle defining a width and a longitudinal depth, each receptacle being sized and configured to removably receive a data storage medium therein, each receptacle having a data communications connector for accessing data contained on the respective data storage medium when the data storage medium is in an engaged position within the receptacle;
   an electrical connector being disposed on the device body and having at least one integrated circuit device being electrically coupled with the data communications connectors of each of the plurality of receptacles, the electrical connector enabling a computing device to electronically access the data contained on the respective data storage medium;
   a power management circuit being electrically coupled to the receptacles to selectively allocate electrical power to a given one of the plurality of receptacles without providing the electrical power to another one of the plurality of receptacles.

2. The device of claim 1 wherein each receptacle is oriented substantially parallel relative to an adjacent receptacle along at least one of the width and longitudinal depth of the receptacles.

3. The device of claim 2 wherein each of the receptacles is oriented in a substantially parallel planar arrangement with respect to adjacent receptacles.

4. The device of claim 3 wherein the receptacles are oriented at an acute angle with respect to the device body.

5. The device of claim 1 wherein the electrical connector is a wireless interface providing interconnectivity between the receptacles and the computing device, and the device further comprises a battery providing power to the power management circuit.

6. The device of claim 1 wherein the receptacles comprise an ejector member, the ejector member being disposed adjacent the receptacle and being operative to release a data storage medium disposed within the receptacle from the engaged position to facilitate removal of the data storage medium from the receptacle.

7. The device of claim 1 in combination with a memory card library capable of holding and providing electrical connectivity to a plurality of data management devices.

* * * * *